Figure 1:
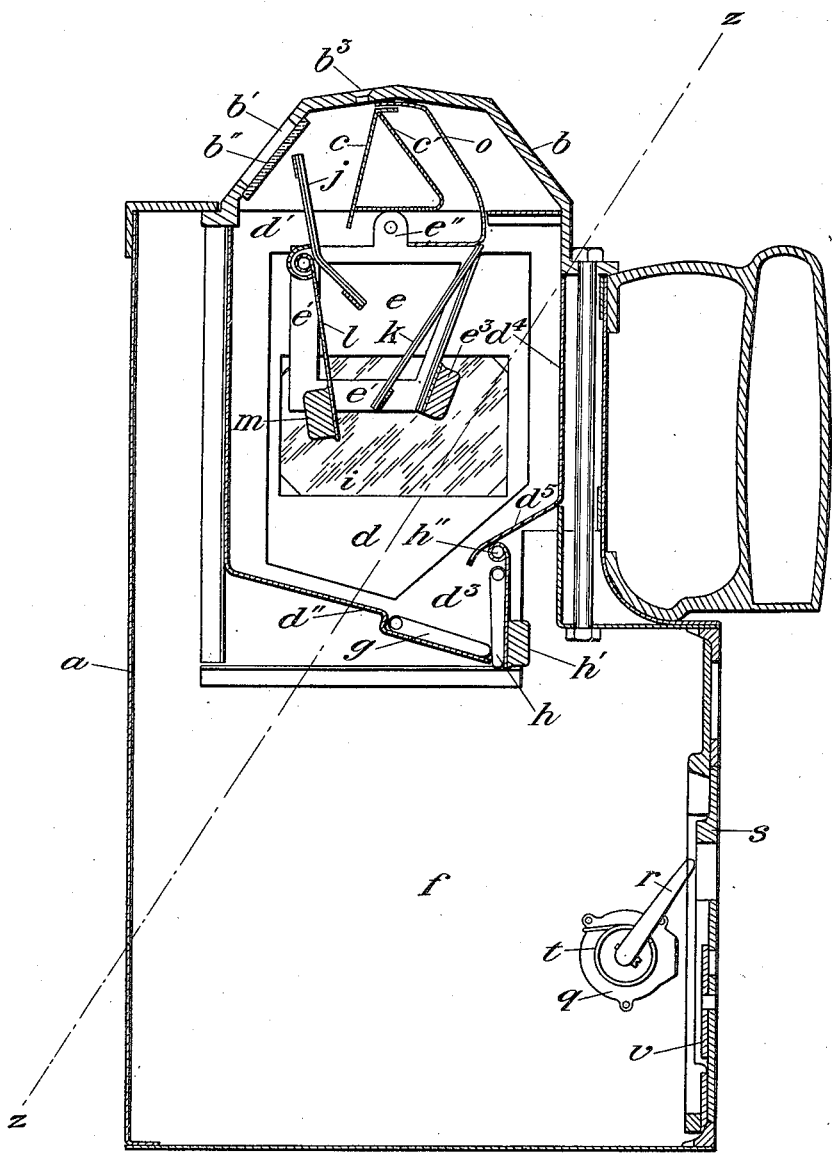

W. COX.
FARE BOX.
APPLICATION FILED AUG. 6, 1912.

1,101,525.

Patented June 30, 1914.
2 SHEETS—SHEET 1.

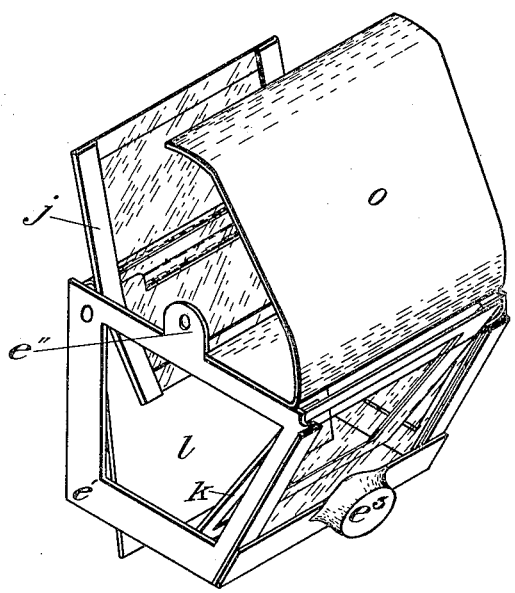
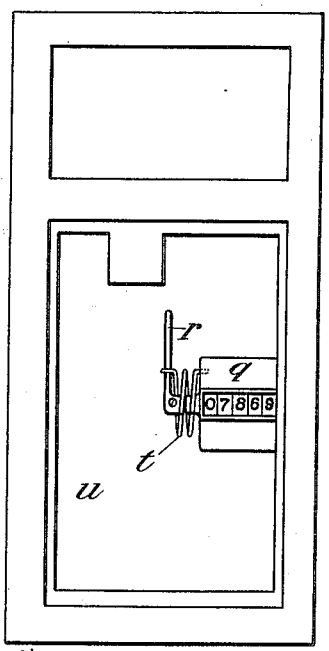
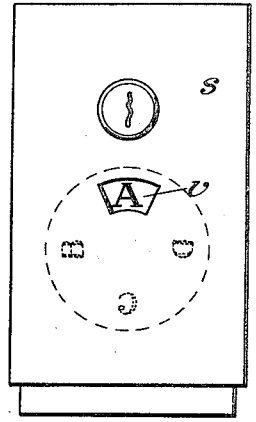

UNITED STATES PATENT OFFICE.

WILLIAM COX, OF TORONTO, ONTARIO, CANADA.

FARE-BOX.

1,101,525.   Specification of Letters Patent.   Patented June 30, 1914.

Application filed August 6, 1912. Serial No. 713,687.

*To all whom it may concern:*

Be it known that I, WILLIAM COX, of the city of Toronto, in the county of York and Province of Ontario, Dominion of Canada, have invented certain new and useful Improvements in Fare-Boxes; and I hereby declare the following to be a full, clear, and exact description of the same.

My invention relates to certain new and useful improvements in portable fare boxes of the class used by fare collectors. Several types of this class of fare box are now in general use, the most satisfactory of these having two or more rows of pivoted teeth between which the fare, when introduced through the fare receiving slot, passes into an examining chamber, the purpose of these teeth being to prevent the abstraction of the fare when introduced into the fare box. Ordinarily when a fare is introduced into the fare box, the pivoted teeth grip it on opposite sides, and support it until the fare is forced into the examining chamber, the fare in many instances when released by the passenger projecting slightly beyond the fare receiving slot and offering a temptation to the collector to abstract it. If the fare happens to be a ticket the pivoted teeth will mutilate it in the event of an attempt being made to pull it out again, and when the fare is a coin the pivoted teeth will grip it with sufficient strength to resist its withdrawal until the teeth break. I have found however that by the use of certain kinds of instruments, I can displace the pivoted teeth and effect a release by them of the fare which has been introduced into the fare box, and that I can then easily abstract the fare without mutilating it or injuring the pivoted teeth.

The object therefore, of my present invention is to provide the fare box with an open throat, devoid of these pivoted teeth or other means which will retard the passage of the fare to the examining chamber, and to provide the examining chamber with a swinging baffle hopper, so arranged that when the fare box is in its upright position it will permit of the passage of the fare to the examining chamber and prevent the insertion of a fare removing instrument thereto, and will in its inverted position prevent the return of the fare from the examining chamber to the fare slot.

In the drawings Figure 1, is a vertical section of a fare box constructed according to my invention. Fig. 2, is a perspective view of the swinging hopper. Fig. 3, is an elevation of the frame for the fare magazine, and Fig. 4, is an elevation of the removable door for the fare magazine.

Like characters of reference refer to like parts throughout the specification and drawings.

As the shell $a$ of the fare box is similar to that of other fare boxes in common use it will not be necessary to enter into any detail description of this part of the device.

On the top of the fare box is a cover $b$ the front side of which is apertured at $b'$ said aperture being closed by a transparent plate $b''$ and in the top of the cover $b$ is a fare slot $b^3$. Projecting within the cover $b$ is an inclined baffle plate $c$ the baffle plate being so disposed within the fare box that its top edge will be slightly in rear of the fare slot $b^3$ and its bottom edge will be slightly in front of it. The top edge of the baffle plate $c$ is slightly below the inner surface of the cover $b$ and is formed with a rearwardly extending flange $c'$.

Within the upper part of the fare box is the examining chamber $d$ formed with an open top as shown at $d'$ for the movement of the swinging hopper $e$ hereinafter described. In the bottom of the examining chamber is a fare chute $d''$ which as shown in Fig. 1 is inclined downwardly from the front toward the rear of the examining chamber, and at the rear end of the fare chute $d''$ is an opening $d^3$ through which the fares pass into the fare magazine $f$. The rear side $d^4$ of the examining chamber $d$ is formed at its lower end with an inclined plate $d^5$ partly overhanging the rear end of the fare chute $d''$. Pivoted to the frame work of the examining chamber $d$ are a set of fingers $g$ which when the fare box is inverted will engage with the free edge of the inclined plate $d^5$ and close the passage from the fare magazine $f$ to the examining chamber $d$ for the purpose of preventing the contents of the fare magazine being directed back into the examining chamber. The pivoted fingers $g$ when the fare box is in its upright or normal position lie upon the top surface of the fare chute $d''$ and to accommodate these pivoted fingers the fare chute is formed substantially as shown in Fig. 1 to provide a recess of substantially the depth of the pivoted fingers $g$ so that when the latter are in the position shown in Fig. 1 their top edges will form a continuation of the plane of the front part of the said fare chute to facilitate the descent of the fares to the opening $d^3$.

When a fare is introduced through the fare slot $b^3$ it passes downwardly along the baffle plate $c$ and through the swinging hopper $e$ to the bottom of the examining chamber $d$ and descends along the fare chute $d''$ to the opening $d^3$ being detained upon the fare chute $d''$ by pivoted fingers $h$ until the fare collector has had an opportunity to examine the same through the opening $b'$ in the cover $b$ or through the side openings $i$ in the sides of the examining chamber, said side openings $i$ being closed by transparent plates similar to $b''$. The fingers $h$ are pivoted to the frame of the examining chamber immediately below the plate $d^5$ and when the fare box is in its upright or normal position the free ends of the fingers $h$ engage with the rear edge of the coin chute $d''$ as shown in Fig. 1. To enable the pivoted fingers $h$ to retard the passage of the fares from the examining chamber into the fare box, I provide the pivoted fingers $h$ with counter weights $h'$ which are pivoted at $h''$ to the frame of the examining chamber as shown in Fig. 1 to swing independently of said pivoted fingers $h$.

When the fares have been examined the fare box is tilted into the position indicated by a dotted line $z$, $z$, in Fig. 1 and in this position the pivoted fingers $h$ and counter weights $h'$ will swing away from the rear edge of the fare chute $d''$ and provide an opening through which the fares can pass from the examining chamber into the fare magazine.

By means of the pivoted fingers $q$ and $h$ I provide a gravity trap which will temporarily detain the fares while being inspected by the fare collector and which will automatically swing open as the upper end of the fare box is tilted rearwardly from a vertical position and which will automatically move to close the opening between the fare magazine and the examining chamber in the event of the fare box being inverted.

While the above features are necessary in the construction of my fare box and operate in conjunction with the swinging hopper $e$ hereinafter described in detail to prevent the abstraction of any of the fares introduced into the fare box they are not in themselves essentially important as I have in the construction of the swinging hopper prevented the abstraction of the fares either by the insertion of instruments or the inversion of the fare box. This swinging hopper forms the essential feature of my present invention and it consists essentially of a frame $e'$ having at its top edge upwardly projecting lugs $e''$ pivoted to the top of the frame of the examining chamber slightly in the rear of the baffle plate $c$. The front of the frame $e'$ extends in front of the baffle plate $c$ and secured to the front of the frame $e'$ is a substantially inclined baffle plate $j$ the top edge of which extends approximately to the cover $b$ and the bottom edge of which extends considerably in rear of the bottom edge of the baffle plate $c$.

The angles of the baffle plates $c$ and $j$ to each other and to the fare slot $b^3$ are such as to prevent an instrument inserted through the fare slot passing directly into the examining chamber. For example if a strip of flexible steel is inserted through the slot $b^3$ it will first come into contact with the baffle plate $c$ and be directed by the latter against the baffle plate $j$ which will arrest its further progress into the examining chamber, this having been demonstrated by the actual use of the fare box. I find however that I can detect any attempt on the part of the fare collector to abstract the contents of the fare box by making the baffle plate $j$ of a frangible character i. e. by making it of mica or other like material which can be broken or punctured by the insertion into the fare box of a metal instrument or any instrument of a rigid character.

Connected to the rear side of the frame $e'$ is an inclined baffle plate $k$ extending from the top to the bottom of said frame. This baffle plate $k$ I use for two purposes first for the purpose of arresting any exceedingly flexible instrument which by any possibility has been inserted past the baffle plate $j$ and second to coöperate with a pivoted shutter $l$ to close the passage from the examining chamber through the swinging hopper. Should an instrument when inserted through the fare slot $b^3$ succeed in passing the baffle plates $c$ and $j$ it will come into contact with the baffle plate $k$ and its arrest will then be effected as its line of movement will be at least at right angles to the direction at which it entered the fare box through the fare slot $b^3$ and it will then be impossible for the operator, or at least exceedingly difficult, to control its line of movement and direct it to the bottom of the examining chamber. The bottom edge of the baffle plate $k$ extends slightly in front of a vertical line passing the bottom edge of the baffle plate $j$ thus bringing the edges of the three baffle plates out of line and preventing the use of a small grappler suspended from a string withdrawing the fares from the examining chamber. Pivoted to the front of the frame $e'$ at or near the top thereof is a shutter $l$ having a counter weight $m$ at its lower edge. When the fare box is inverted the shutter $l$ swings against the bottom edge of the baffle plate $k$ and forms therewith a substantially wedge shaped trap which prevents the contents of the examining chamber obtaining a passage through the swinging hopper to the fare slot $b^3$. To close the fare slot $b^3$ I use a shutter $o$ extending upwardly from the top of the frame $e'$ and passing between the flange $c'$ and the inner side of the cover $b$. When the fare box is tilted into the position indicated by a dotted line $z$—$z$ in Fig. 1 a counter weight $e^3$ secured to the bottom of the swinging frame $e'$ causes the swinging hopper to change its relative position within the examining chamber and move the shutter $o$ to close the fare slot $b^3$.

As shown in Fig. 3 I use a numbering register $q$ having a spring tensioned lever $r$ which as shown in Fig. 1 normally rests against the door $s$. When the door $s$ is opened the spring $t$ throws the lever $r$ outward through the opening $u$ and when the door $s$ is replaced it engages the lever $r$ and throws it back to a normal position as shown in Fig. 1. This movement of the lever to the position shown in Fig. 1 operates the numbering wheels and causes them to register each time the door is opened and closed again. The registering mechanism $q$ is similar to that in common use for various purposes, with the exception of the spring tensioned lever $r$ which is thrown by its spring to project through the opening $u$ of the door so that on each occasion the door is opened and closed again the numbering wheels will register. I have also provided the door $s$ with a dial $v$ for indicating the series upon which the combination lock is set this I find advisable for permutation purposes.

Having thus fully described my invention what I claim as new and desire to secure by Letters Patent is;

1. A fare box comprising an examining chamber, a cover therefor having a fare receiving slot therein, a stationary baffle opposed to the fare receiving slot within the upper part of the examining chamber, a swinging hopper pivoted within the examining chamber below said baffle and having a shutter movable therewith, said shutter passing between the baffle and inner side of the cover to close the fare receiving slot.

2. A fare box comprising an examining chamber, a cover therefor having a fare receiving slot therein, an inclined baffle opposed to the fare receiving slot within the upper part of the examining chamber, a swinging hopper pivoted within the examining chamber below said baffle and having a shutter movable therewith, said shutter passing between the baffle and inner side of the cover to close the fare receiving slot.

3. A fare box comprising an examining chamber having a cover with a fare receiving slot therein, a swinging hopper within the examining chamber, a baffle opposed at one side of the hopper and a hinged shutter at the other side to engage against said baffle when the fare box is tilted in one direction and close the passage through said hopper, and a shutter attached to said hopper to move across the fare receiving slot and close it when the fare box is tilted in the opposite direction.

4. A fare box comprising an examining chamber having a cover with a fare receiving slot therein, a swinging hopper within the examining chamber, a baffle plate at one side of the hopper and a hinged shutter at the other side to engage against said baffle plate when the fare box is tilted in one direction and close the passage through said hopper, and a shutter attached to said hopper to move across the fare receiving slot and close it when the fare box is tilted in the opposite direction, in combination with a stationary baffle between the hopper and fare receiving slot, said baffle being clear of the path of the shutter as it swings with the hopper.

5. A fare box comprising an examining chamber having a cover with a fare receiving slot therein, a stationary baffle within the upper part of the examining chamber and inclined with respect to the path through the fare receiving slot, a swinging hopper within the examining chamber below said baffle, a baffle plate fixedly connected to the hopper and inclined in the opposite direction to said stationary baffle, a shutter connected to the hopper to pass between said stationary baffle and the cover of the examining chamber and close the fare receiving slot when the fare box is tilted in one direction; a hinged shutter pivotally connected to the hopper and a baffle plate fixedly connected to the hopper to be engaged by the hinged shutter when the fare box is tilted in the opposite direction.

6. A fare box having a fare admitting slot, a stationary baffle within the fare box angularly disposed to said slot, a hopper suspended to swing within the fare box below said slot and baffle, a baffle carried by said hopper and angularly opposed to the stationary baffle, and a shutter carried by said hopper to close said slot.

7. A fare box having a fare admitting slot, a hopper suspended to swing within the fare box, an inclined baffle fixedly connected to the hopper, and a shutter hingedly connected to the hopper to close against said baffle.

8. A fare box having a fare admitting slot, a hopper suspended to swing within the fare box, an inclined baffle fixedly connected to the hopper, a shutter hingedly connected to the hopper to close against said baffle, and a shutter fixedly connected to said hopper to close said slot.

9. A fare box having a fare admitting slot, a hopper suspended to swing within the fare box, an inclined baffle fixedly connected to the hopper, a shutter hingedly connected to the hopper to close against said baffle, a stationary baffle within the fare box angularly disposed to said slot, and a second baffle connected to the hopper and angularly opposed to the stationary baffle.

10. A fare box having a fare admitting slot, a stationary baffle within the fare box angularly disposed to said slot, an examining chamber within the fare box below said baffle, a hopper suspended to swing within said examining chamber, an inclined baffle connected to the lower part of said hopper, a shutter hingedly connected to the hopper to close against said inclined baffle, a baffle connected to the upper part of the hopper angularly opposed to the stationary baffle, and a shutter fixedly connected to the hopper to close said slot.

Toronto, August 3rd, 1912.

WILLIAM COX.

Signed in the presence of—
C. H. RICHES,
STANLEY RICHES.

Copies of this patent may be obtained for five cents each, by addressing the "Commissioner of Patents, Washington, D. C."